(12) United States Patent
Bergman et al.

(10) Patent No.: US 8,710,131 B2
(45) Date of Patent: *Apr. 29, 2014

(54) STABILIZED REDISPERSIBLE POLYMER POWDER COMPOSITIONS

(75) Inventors: Roger Bergman, Midland, MI (US); Liang Hong, Midland, MI (US); Linda Kim-Habermehl, Midland, MI (US); Mladen Ladika, Midland, MI (US)

(73) Assignee: Dow Global Technologies, LLC, Midland, MI (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/979,593

(22) Filed: Dec. 28, 2010

(65) Prior Publication Data

US 2011/0160347 A1    Jun. 30, 2011

Related U.S. Application Data

(60) Provisional application No. 61/335,011, filed on Dec. 30, 2009.

(51) Int. Cl.
*C08L 13/00* (2006.01)

(52) U.S. Cl.
USPC ............... 524/284; 524/2; 524/186; 524/105; 524/393; 524/321; 524/559; 524/239

(58) Field of Classification Search
USPC ....................................................... 524/284
See application file for complete search history.

(56) References Cited

U.S. PATENT DOCUMENTS

| | | | |
|---|---|---|---|
| 3,409,578 A | 11/1968 | Hwa | |
| 5,268,430 A * | 12/1993 | Wang | 525/310 |
| 5,445,945 A * | 8/1995 | Drechsler | 435/29 |
| 5,576,378 A | 11/1996 | Kuhlmann | |
| 5,804,632 A | 9/1998 | Haddleton | |
| 5,900,451 A | 5/1999 | Krishnan | |
| 5,922,796 A | 7/1999 | Colombet | |
| 6,130,287 A | 10/2000 | Krishnan | |
| 6,391,952 B1 | 5/2002 | Bett | |
| 6,554,894 B2 * | 4/2003 | Styron et al. | 106/705 |
| 2004/0235982 A1 | 11/2004 | Rabasco et al. | |
| 2007/0238825 A1 | 10/2007 | Takamura et al. | |
| 2009/0223416 A1 * | 9/2009 | Aberle et al. | 106/822 |

FOREIGN PATENT DOCUMENTS

| WO | WO 2008/140852 | * 11/2008 |
|---|---|---|
| WO | 2009099717 | 8/2009 |

* cited by examiner

*Primary Examiner* — Doris Lee (74) *Attorney, Agent, or Firm* — Andrew E. C. Merriam (57) ABSTRACT

A water redispersible polymer powder may be produced by drying an aqueous mixture of a water insoluble film-forming polymer and a colloidal stabilizer comprising a chelating agent to obtain a water redispersible polymer powder, where the amount of chelating agent is at least 0.1% by weight, preferably at least 1% by weight, most preferably at least 3% by weight, based upon the weight of the water insoluble film-forming polymer. Dispersions or polymer compositions containing a chelating agent as a colloidal stabilizer exhibit an unexpectedly low viscosity which facilitates spray drying and permits use of high solids content dispersions with low pressure spray drying to increase production efficiency. The chelating agents are stable at high pH and so high pH spray dryable compositions containing them as a colloidal stabilizer may sit or be stored for prolonged periods of time prior to spray drying without loss of effectiveness of the colloidal stabilizer.

11 Claims, 2 Drawing Sheets

STABILIZED REDISPERSIBLE POLYMER POWDER COMPOSITIONS

This application claims the benefit of priority under 35 U.S.C. §119(e) of U.S. Provisional Patent Application No. 61/335,011 filed on Dec. 30, 2009. The present invention relates to redispersible polymer powder compositions which are stabilized by protective colloids.

FIELD OF INVENTION

Background of the Invention

In construction materials, an organic polymer is generally added to improve adhesion of an inorganic component such as concrete. The organic polymer is typically a latex, such as vinyl acetate ethylene, and can be supplied in the dry, powder form. The powdered form is generally produced by spray drying a liquid polymer composition to obtain a powder having submicron particle sizes. To perform its function in the application formulation to which it is added, such as concrete, it is desired that in the application formulation the polymer powder is redispersed to submicron particle size. Various colloidal stabilizers and anti-caking agents are included with the polymer powder to enable this redispersibility. Partially hydrolyzed polyvinyl alcohol (PVOH) is generally used as a protective colloid to improve the redispersibility of organic polymers. However, for effective redispersibility a large amount of PVOH is needed and it tends to adversely increase the viscosity of the polymer composition or dispersion making it difficult to produce a powder by spray drying. Moreover, at high pH values that are generally employed in polymer compositions or dispersions for making redispersible powders for high pH application formulations, such as cement formulations, partially hydrolyzed PVOH may continue to hydrolyze, reducing effectiveness of PVOH as a protective colloid.

A colloid is a type of chemical mixture in which one substance is dispersed evenly throughout another. The particles of the dispersed substance are only suspended in the mixture, unlike in a solution, in which they are completely dissolved. This occurs because the particles in a colloid are larger than in a solution and small enough to be dispersed evenly and maintain a homogeneous appearance, but large enough to scatter light and not dissolve. A colloidal system consists of two separate phases: a dispersed phase (or internal phase) and a continuous phase (or dispersion medium). A colloidal system may be solid, liquid, or gaseous.

Forces which may play an important role in the interaction of colloid particles include: 1) excluded volume repulsion, which is the impossibility of any overlap between hard particles, 2) electrostatic interaction where colloidal particles often carry an electrical charge and therefore attract or repel each other and the charge of both the continuous and the dispersed phase, as well as the mobility of the phases are factors affecting this interaction, 3) van der Waals forces which is the interaction between two dipoles that are either permanent or induced, where even if the particles do not have a permanent dipole, fluctuations of the electron density gives rise to a temporary dipole in a particle, which induces a dipole in particles nearby, and the temporary dipole and the induced dipoles are then attracted to each other, 4) entropic forces which according to the second law of thermodynamics, a system progresses to a state in which entropy is maximized, and this can result in effective forces even between hard spheres, and 5) steric forces between polymer-covered surfaces or in solutions containing non-adsorbing polymer which can modulate interparticle forces, producing an additional steric repulsive force or an attractive depletion force between them.

Colloidal stabilization prevents colloids from aggregating. Steric stabilization and electrostatic stabilization are the two main mechanisms for colloid stabilization. Electrostatic stabilization is based on the mutual repulsion of like electrical charges. In general, different phases have different charge affinities, so that an electrical double layer forms at any interface. Small particle sizes lead to enormous surface areas, and this effect is greatly amplified in colloids. In a stable colloid, mass of a dispersed phase is so low that its buoyancy or kinetic energy is too weak to overcome the electrostatic repulsion between charged layers of the dispersing phase.

Unstable colloidal dispersions form flocs as the particles aggregate due to interparticle attractions. Floc formation or aggregation may result from removal of the electrostatic barrier that prevents aggregation of the particles. Electrostatic barrier removal can occur by the addition of salt to a suspension or by changing the pH of a suspension to effectively neutralize or "screen" the surface charge of the particles in suspension. This removes the repulsive forces that keep colloidal particles separate and allows for coagulation due to van der Waals forces. Also, addition of a charged polymer flocculent can bridge individual colloidal particles by attractive electrostatic interactions. Furthermore, addition of non-adsorbed polymers called depletants can cause aggregation due to entropic effects. Also, physical deformation of the particle (e.g., stretching) may increase the van der Waals forces more than stabilization forces (such as electrostatic), resulting in coagulation of colloids at certain orientations.

Unstable colloidal suspensions of low-volume fraction form clustered liquid suspensions, where individual clusters of particles fall to the bottom of the suspension or float to the top depending on whether the particles are less dense than the suspending medium, once the clusters are of sufficient size for the Brownian forces that work to keep the particles in suspension to be overcome by gravitational forces. However, colloidal suspensions of higher-volume fraction form colloidal gels with viscoelastic properties.

Colloidal stabilizers other than PVOH employed in redispersible polymer compositions include end functionalized PVOH, polyvinylpyrrolidones, saccharides, polyvinyl sulfonic acid, cellulose, and polyester. However, these components used alone may also have the drawbacks of high costs or high usage levels, or significantly increased viscosity of the dispersion prior to spray drying, or undesirable sensitivity to pH in the dispersion or in the application formulation.

U.S. Pat. No. 3,409,578 to Hwa discloses powdered water-insoluble polymers dispersible in aqueous media which contain a surface-hardening metal ion, such as a monovalent heavy metal ion, for example, silver, cuprous, or mercurous ion, which forms a water-insoluble carboxylic salt, or a polyvalent metal ion such as copper or mercury or calcium ion. The surface-hardening metal ions produced in the aqueous medium, it is disclosed, link with the carboxylate groups in the polymer or dispersant to form a protective layer or skin around the polymer particles which prevents fusion of the particles together on drying. The amount of the surface-hardening metals may be the stoichiometric equivalent or more of the carboxylate groups available on the polymer and/or the dispersant. To redisperse the polymers to produce a latex with a particle size essentially the same at the original latex, it is necessary to add a material which withdraws the surface-hardening metal ion by forming an insoluble salt or complex ion therewith. A salt-type of sequestering agent or complexing agent which serves to withdraw the polyvalent metal ion from the scene of the aqueous medium may employed, such as alkali metal salts of alkylenepolyaminepolyacetates, such as sodium ethylenediaminetetraacetate. The agent for withdrawing the surface-hardening ions, such as the sequestering agent may be added in the form of a dry pulverized material just before the polymer powder is to be redispersed in the aqueous medium in which it is to be used. The withdrawing agent is preferably employed in an amount which is the stoichiometric equivalent of the surface-hardening metal ions present or added. However, the presence of large amounts of surface hardening agents may adversely affect end use applications of the redispersible powder. Use of a chelating agent as a colloidal stabilizer in the production of a redispersible polymer powder is not disclosed.

The present invention provides a redispersible polymer powder which is unexpectedly colloidally stabilized with a chelating agent to provide excellent redispersibility of the polymer powder into submicron particle sizes. The colloidally stabilized redispersible polymer powders of the present invention may be produced without the need for forming a protective layer or skin around the polymer particles with surface-hardening metal ions to prevent fusion of the particles together on drying. Also, the colloidally stabilized redispersible polymer powders of the present invention may be redispersed in an aqueous medium without the need for withdrawing surface hardening ions from the surface of the polymer particles on redispersion. The chelating agents provide unexpectedly low viscosity of the dispersion or polymer composition to be spray dried. The low viscosity facilitates spray drying of the polymer composition into a redispersible powder and results in high productivity. The use of a chelating agent colloidal stabilizer avoids the need for high pressure equipment for spray drying compared to PVOH spray dryable compositions. Also, upon redispersion in water, the redispersible polymers of the present invention exhibit low viscosity which may ease their incorporation into application formulations. The chelating agents exhibit stability at a high pH and accordingly prior to spray drying they provide colloidal stability in high pH water insoluble polymer formulations, such as those employed to make redispersible powders for cement formulations.

SUMMARY OF THE INVENTION

A water redispersible polymer powder which includes a co-dried admixture of a water insoluble film-forming polymer and a colloidal stabilizer which includes a chelating agent in an amount of least 0.1% by weight, preferably at least 1% by weight, most preferably at least 3% by weight, based upon the weight of the water insoluble film-forming polymer is unexpectedly colloidally stabilized. The chelating agents surprisingly provide excellent colloidal stabilization and therefore excellent redispersibility of polymer powders into submicron particle sizes. In addition, upon redispersion in water, the redispersible polymers of the present invention exhibit low viscosity which may ease their incorporation into application formulations. The chelating agents exhibit stability at a high pH, for example at a pH of 11 or more, and accordingly provide colloidal stability in high pH water insoluble polymer formulations, such as those used to make redispersible powders for cement formulations.

In an aspect of the present invention a water redispersible polymer powder may be produced by drying an aqueous mixture of a water insoluble film-forming polymer and a colloidal stabilizer comprising a chelating agent to obtain a water redispersible polymer powder, wherein the amount of chelating agent is at least 0.1% by weight, preferably at least 1% by weight, most preferably at least 3% by weight, based upon the weight of the water insoluble film-forming polymer. The chelating agents do not adversely increase viscosity of the liquid polymer composition which facilitates spray drying and therefore production of the polymer composition into a redispersible powder.

In another aspect of the present invention, a composition, such as a construction composition, contains a water redispersible polymer powder as an additive where the water redispersible polymer powder includes a co-dried admixture of a water insoluble film-forming polymer and a colloidal stabilizer which includes a chelating agent in an amount of least 0.1% by weight, preferably at least 1% by weight, most preferably at least 3% by weight, based upon the weight of the water insoluble film-forming polymer.

BRIEF DESCRIPTION OF THE DRAWINGS

The present invention is further illustrated by the accompanying drawings wherein.

DETAILED DESCRIPTION OF THE INVENTION

Water redispersible polymer powders of the present invention include a co-dried admixture of a water insoluble film-forming polymer and a colloidal stabilizer. The colloidal stabilizer includes a chelating agent in an amount of least 0.1% by weight, preferably at least 1% by weight, most preferably at least 3% by weight, based upon the weight of the water insoluble film-forming polymer which surprisingly provide excellent colloidal stabilization and therefore excellent redispersibility of polymer powders into submicron particle sizes. Without wishing to be bound by theory, it is believed that prior to redispersing in water, the particles of the redispersible polymer powders of the present invention have a discontinuous phase of water insoluble film-forming polymer, and a continuous phase of chelating agent. Dispersions or polymer compositions containing a chelating agent as a colloidal stabilizer in accordance with the present invention exhibit an unexpectedly low viscosity which facilitates spray drying and permits the use of high solids content dispersions with low pressure equipment for spray drying which increases production efficiency. Also, the chelating agents are stable at high pH values that may be employed in polymer compositions or dispersions for making redispersible powders for high pH application formulations, such as cement formulations. The spray dryable compositions containing a chelating agent as a colloidal stabilizer may sit or be stored for prolonged periods of time without loss of effectiveness as a colloidal stabilizer. The high stability of the chelating agents at a high pH provides significant processing advantages over the use of a PVOH colloidal stabilizer. At high pH PVOH may hydrolyze, which may cause significant reduction of effectiveness of PVOH as a protective colloid within about an hour after preparation of a spray dryable dispersion or polymer composition. It is believed that a high pH before spray drying, which may be employed in the present invention, increases surface charge density on latex polymers which may be beneficial to improve redispersibility of the spray dried powder. In addition, compared to redispersible polymer powders which contain only PVOH as a colloidal stabilizer, the redispersible polymer powders of the present invention may be advantageously employed in applications which require high water resistance and use high polymer loadings.

Chelating agents which may be employed as a colloidal stabilizer for the water insoluble redispersible polymer powders of the present invention for preventing aggregation or flocculation of the water insoluble polymer particles and for promoting redispersibility in an aqueous media to submicron particle sizes include any substance whose molecules can form several bonds to a single metal ion, or any multidentate ligand. Usually the ligands are organic compounds and are called chelants, chelators, chelating agents, or sequestering agents, which in embodiments of the invention may be biodegradable.

acid, nitrilotriacetic acid (NTA), 2,3-dimercaptosuccinic acid (DMSA), sodium diethanolglycine, and salts thereof, and mixtures thereof. Examples of biodegradable chelating agents which may be used are [S,S]-ethylenediaminedisuccinic acid (EDDS), and methylglycinediacetic acid (MGDA). Preferred chelating agents for use in the present invention are at least one of alkylenepolyaminepolyacetates and salts thereof, such as ethylenediaminetetraacetic acid (EDTA), diethylenetriaminepentacetic acid (DTPA), N-(hydroxyethyl)ethylene-diaminetetraacetic acid (HEDTA), and salts thereof, and nitrilotriacetic acid (NTA) and salts thereof, and mixtures thereof. In addition to the acid forms of the chelating agent, the salts which may be employed include alkali metal salts, such as sodium, disodium, or tetrasodium salts, diammonium salts, and tetraammonium salts as well as other salts. The physical form of the chelating agent includes liquids, powder, and crystal forms.

Properties of commercially available EDTA-based chelating agents, produced by The Dow Chemical Company, Midland Mich., which may be employed in the present invention are shown in Table 1:

TABLE 1

Typical Properties of EDTA (ethylenediaminetetraacetic acid) Based Chelating Agents

| PRODUCT | Composition | Appearance | Chelation Value |
|---|---|---|---|
| VERSENE 100 | Tetrasodium ethylene-diaminetetraacetate | Amber, light | 102 (mg as CaCO3 per g) |
| VERSENE 100E | Tetrasodium ethylene-diaminetetraacetate | Amber, light | 1 g has the equivalent chelation capacity of 1.0 mmoles of EDTA |
| VERSENE 100E LC | Tetrasodium ethylene-diaminetetraacetate | Amber, light | 1 g has the equivalent chelation capacity of 1.0 mmoles of EDTA |
| VERSENE 100 XL | Tetrasodium ethylene-diaminetetraacetate | Amber, light | 102 (mg as CaCO3 per g) |
| VERSENE 100 EP | Tetrasodium ethylene-diaminetetraacetate | Amber, light | 102 (mg as CaCO3 per g) |
| VERSENE diammonium EDTA | Diammonium ethylene-diaminetetraacetate | Light straw-colored liquid | 137 (mg as CaCO3 per g) |
| VERSENE tetraammonium EDTA | Tetraammonium ethylene-diaminetetraacetate | Light straw-colored liquid | 130 (mg as CaCO3 per g) |
| VERSENE Powder | Tetrasodium ethylene-diaminetetraacetate | White to cream powder | 215 (mg as CaCO3 per g) |
| VERSENE 220 Crystals | Tetrasodium ethylene-diaminetetraacetate tetrahydrate | White crystalline powder | 219 (mg as CaCO3 per g) |
| VERSENE 220E | Tetrasodium ethylene-diaminetetraacetate tetrahydrate | White crystalline powder | 215 (mg as CaCO3 per g) |
| VERSENE Na2 crystals | Disodium ethylene-diaminetetraacetate dihydrate | White to off-white powder | 267 (mg as CaCO3 per g) |
| VERSENE Acid | Ethylenediaminetetraacetic acid | White powder | 339 (mg as CaCO3 per g) |
| VERSENE NA disodium EDTA | Disodium ethylene-diaminetetraacetate dihydrate | White to off-white powder | 267 (mg as CaCO3 per g) |
| VERSENE Ca | Calcium disodium ethylene-diaminetetraacetate dihydrate | White to off-white powder | Already a calcium chelate of EDTA |

Exemplary of chelating agents which may be employed in the present invention are at least one of alkylenepolyamine-polyacetates, porphyrins, ethylenediamine and its derivatives, Dimercaprol or 2,3-dimercapto-1-propanol, succinic Properties of commercially available DTPA-Based, HEDTA-Based, and NTA Based Chelating Agents, produced by The Dow Chemical Company, Midland Mich., which may be employed in the present invention are shown in Table 2:

TABLE 2

Typical Properties of DTPA-, HEDTA-, and NTA Based Chelating Agents

| PRODUCT | Composition | Appearance | Chelation Value |
|---|---|---|---|
| VERSENEX 80 | Pentasodium diethylene-triaminepentaacetate | Light straw-colored liquid | 80 (mg as CaCO3 per g) |
| VERSENEX 80E | Pentasodium diethylene-triaminepentaacetate | Light straw-colored liquid | 1 g has the equivalent chelation capacity of 0.8 mmoles of DTPA |
| VERSENEX 105 | Pentasodium diethylene-triaminepentaacetate | Light straw-colored liquid | 1 g has the equivalent chelation capacity of 1.05 mmoles of DTPA |
| XUS-40864.00L | Pentasodium diethylene-triaminepentaacetate | Light straw-colored liquid | 106 (mg as CaCO3 per g) |
| VERSENEX DTPA | Diethylenetriaminepentaacetic acid | White Powder | 1 g has the equivalent chelation capacity of 2.5 mmoles of DTPA |
| VERSENOL 120 | Trisodium N-(hydroxyethyl)-ethylenediaminetriacetate | Light straw-colored liquid | 120 (mg as CaCO3 per g) |
| VERSENOL 120E | Trisodium N-(hydroxyethyl)-ethylenediaminetriacetate | Light straw-colored liquid | 1 g has the equivalent chelation capacity of 1.20 mmoles of HEDTA |
| VERSENE NTA 148 | Trisodium nitrilotriacetate | Clear straw-colored liquid | 1 g has the equivalent chelation capacity of 1.48 mmoles of NTA |
| VERSENE NTA 152 | Trisodium nitrilotriacetate | Clear straw-colored liquid | 1 g has the equivalent chelation capacity of 1.52 mmoles of NTA |
| VERSENE NTA LC | Trisodium nitrilotriacetate | Clear straw-colored liquid | 1 g has the equivalent chelation capacity of 1.48 mmoles of NTA |
| VERSENE NTA crystal | Trisodium nitrilotriacetate monohydrate | White crystals | 1 g has the equivalent chelation capacity of 3.58 mmoles of NTA |
| VERSENE NTA acid | Nitrilotriacetic Acid | White to off-white crystalline powder | 1 g has the equivalent chelation capacity of 5.2 mmoles of NTA |

The amount of chelating agent employed in the present invention should be sufficient to provide colloidal stability, but not so high as to adversely interfere with the final application of the water redispersible polymer powder. In embodiments of the invention the amount of chelating agent employed to achieve colloidal stability may be at least 0.1% by weight, preferably at least 1% by weight, most preferably at least 3% by weight, generally 1% by weight to 20% by weight, for example 3% by weight to 15% by weight, based upon the weight of the water insoluble film-forming polymer.

The polymers which may be employed in the present invention are any water insoluble film-forming polymers. Exemplary of homopolymers or copolymers which may be used as the water insoluble film-forming polymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers and styrene-1,3-butadiene copolymers, and copolymer of various acrylic esters. In embodiments of the invention, the film-forming polymers may be at least one polymer prepared from at least one ethylenically unsaturated monomer, such as a styrene butadiene copolymer, a styrene butadiene copolymerized with other comonomers such as acrylate, or vinyl comonomers, a vinylacetate ethylene (VAE) copolymer, a VAE/VeoVA copolymer mixture (vinylacetate ethylene copolymer/vinyl ester of versatic acid copolymer mixture), a polyurethane, an epoxy, a polyolefin, or other water insoluble, film-forming polymers. The chelating agent may also be employed as a colloidal stabilizer in cellulose-based dispersions in accordance with the present invention.

In embodiments of the invention, the water-insoluble film-forming polymers may be prepared in conventional manner from ethylenically unsaturated monomers, such as vinyl and/or acrylate monomers. Exemplary of water-insoluble film-forming polymers which may be used are vinyl or acrylate homopolymers or vinyl acetate, styrene/butadiene, styrene/acrylate, acrylate and styrene/butadiene/acrylate copolymers, and mixtures thereof.

Exemplary monomers which may be employed are vinyl esters, such as vinyl acetate; alkyl acrylates and methacrylates in which the alkyl group contains from 1 to 10 carbon atoms, for example methyl, ethyl, n-butyl and 2-ethylhexyl acrylates and methacrylates; and vinylaromatic monomers, such as styrene. These monomers may be copolymerized with one another or with other ethylenically unsaturated monomers.

Exemplary of monomers which can be copolymerized with vinyl acetate and/or acrylic esters and/or styrene to obtain water insoluble film forming polymers for use herein are ethylene and olefins such as isobutene; the vinyl esters of saturated, branched or unbranched monocarboxylic acids having from 1 to 12 carbon atoms, such as vinyl propionate, the esters of unsaturated mono- or dicarboxylic acids possessing 3 to 6 carbon atoms with alkanols possessing 1 to 10 carbon atoms, such as methyl, ethyl, butyl and ethylhexyl maleates and fumarates; vinylaromatic monomers such as methylstyrenes and vinyltoluenes; vinyl halides such as vinyl chloride and vinylidene chloride, and diolefins, such as butadiene.

The water insoluble film-forming polymer may have a surface which is carboxylated, in conventional amounts. In embodiments of the invention, the water insoluble film forming polymer preferably is carboxylated, particularly for highly hydrophobic polymers such as styrene butadiene copolymers, for redispersibility. The amount of carboxylation may generally be from 0.1% to 15% by weight, for example from 0.5% by weight to 5% by weight, of at least one ethylenically unsaturated monocarboxylic acid, dicarboxylic acid, salts thereof, or mixtures thereof, based upon the total comonomer weight or the weight of the water insoluble film forming polymer, such as a styrene butadiene copolymer with itaconic acid.

In preferred embodiments, the water insoluble film forming polymers used to obtain the redispersible polymer powders of the present invention comprise carboxylated copolymers of vinyl aromatic comonomers and 1,3-diene comonomers. The water insoluble film forming polymers may have a controlled distribution and degree of neutralization of the carboxylic groups.

Examples of vinylaromatic comonomers which may be used are styrene, alpha-methylstyrene, $C_1$-$C_4$ alkyl-styrenes such as o-vinyltoluene and tert-butylstyrene, with styrene being preferred. Examples of 1,3-dienes which may be used are 1,3-butadiene and isoprene, with 1,3-butadiene being preferred. Examples of comonomers which may be used are ethylenically unsaturated mono- and dicarboxylic acids and their salts, such as acrylic acid, methacrylic acid, fumaric acid, maleic acid and/or itaconic acid. Dicarboxylic acids or their salts, particularly itaconic acid, fumaric acid, their salts and combinations thereof, are preferred.

In embodiments of the invention, the amount of carboxylic groups in the polymer that are located at the surface of the polymer particles in the powder, and the amount of carboxylic groups that are present in their salt form in the polymer powder may be controlled so that at least 50%, preferably at least 60%, more preferably at least 70% of the total number of carboxylic groups present in the polymer are located at the surface of the polymer particles in the powder and at least 75%, preferably at least 85%, more preferably at least 90%, and most preferably at least 95% of the carboxylic groups in the powder are present in their salt form. Useful cations in the carboxylic acid salts are ammonium, alkali metal ions and alkaline earth metal ions.

A high percentage of the carboxylic groups located at the surface of the polymer particles in the powder can be obtained: a) by the sole use of one or more ethylenically unsaturated dicarboxylic acid(s) as the comonomer, such as fumaric or itaconic acid or combinations thereof, or b) by staged monomer feeding, such as addition of the comonomer at an advanced stage of the polymerizations, for example when 60% by weight or more of the monomers are polymerized or c) by conducting the polymerization at a certain pH, for example at a pH of 2 to 9, preferably at a pH of 2 to 6.

Examples of optional comonomers which may be employed in the water insoluble film-forming polymers are ethylenically unsaturated carboxamides and carbonitriles, preferably acrylamide, methacrylamide, acrylonitrile or methacrylonitrile; alkyl esters of acrylic acid or methacrylic acid, such as methyl acrylate, methyl methacrylate, n-butyl acrylate, n-butyl methacrylate, ethyl acrylate, ethyl methacrylate, or 2-ethylhexyl methacrylate, diesters of fumaric acid or maleic acid, such as the diethyl or diisopropyl esters, hydroxy alkyl acrylates or methacrylates, such as 2-hydroxy ethylacrylate; functional monomers such as sodium styrene sulfonate or sulfo ethylmethacrylate and sulfo propylmethacrylate. Other examples of optional comonomers are crosslinking comonomers, such as comonomers with two or more ethylenic unsaturations, such as divinyl benzene, divinyl adipates, diallyl maleate, allyl methacrylate or triallyl cyanurate, or postcrosslinking comonomers, such as acrylamidoglycolic acid (AGA), methyl methylacrylamidoglycolate (MAGME), N-methylol-acrylamide (NMA), N-methylolmethacrylamide, allyl N-methylolcarbamate, alkyl ethers, such as isobutoxy ether, or esters of N-methylolacrylamide, of N-methylolmethacrylamide, or of allyl N-methylol-carbamate. Other comonomers which may be employed are epoxy-functional comonomers, such as glycidyl methacrylate and glycidyl acrylate. Other examples of comonomers which may be used are silicon-functional comonomers, such as acryloxypropyl-tri(alkoxy)- and methacryloxypropyltri (alkoxy)silanes, vinyltrialkoxysilanes and vinylmethyldialkoxysilanes. Examples of alkoxy groups which may be present include ethoxy radicals and ethoxy(propylene glycol) ether radicals.

In embodiments of the invention, the polymer may comprise: a) from 20% to 79.9%, preferably from 30% to 70%, of the one or more vinyl aromatic comonomers, b) from 20% to 79.9%, preferably from 20% to 60% of the one or more 1,3-diene comonomers, c) from 0.1% to 15%, preferably from 0.5% to 10%, of the one or more ethylenically unsaturated mono- and di-carboxylic acid comonomers, and d) from 0 to 40%, preferably from 0 to 20% of the one or more additional comonomers, based on the total weight of the copolymer. Most preferably, the polymer comprises from 50 to 70 percent of comonomer a), from 25 to 49 percent of comonomer b), and from 1 to 5 percent of comonomer c).

Also, a basic compound may be employed in an aqueous polymer dispersion of the water insoluble film-forming polymer to convert the majority of the carboxylic acid groups or carboxylic acid anhydride groups in the polymer into the salt form of the acid groups. The amount of the basic compound included may be: 1) equivalents of at least 0.5, preferably from 0.6 to 1.2, more preferably from 0.7 to 1.1, most preferably from 0.8 to 1.0 of a basic compound per equivalent of carboxylic groups in the polymer, or 2) a basic compound sufficient to adjust the pH of the dispersion to at least 9.5, preferably at least 10.0, more preferably at least 10.5, and preferably up to 12.5, more preferably up to 12.0, most preferably up to 11.5. The basic compound is preferably an inorganic basic compound, more preferably a strong inorganic basic compound, particularly an alkali metal hydroxide or an alkaline earth metal hydroxide, such as NaOH, KOH, LiOH, $Mg(OH)_2$ Or $Ca(OH)_2$. Most preferably, the basic compound is an alkali metal hydroxide, such as sodium hydroxide or potassium hydroxide.

In embodiments of the invention, the film-forming polymers may have a glass transition temperature of from −60° C. to +80° C., preferably from −20° C. to +50° C., more preferably from −10° C. to +30° C. The monomers and the proportions by weight of the comonomers may generally be chosen to obtain a desired glass transition temperature. The glass transition temperature Tg of the polymers can be determined in a known manner by means of differential scanning calorimetry (DSC).

The polymers or copolymers can be prepared by an emulsion polymerization process or a suspension polymerization process, preferably by a emulsion polymerization process. Conventional polymerization reaction temperatures may be employed, and generally range from 0° C. to 105° C., preferably from 30° C. to 95° C., for example from 30° C. to 70° C., or from 60° C. to 95° C.

The polymerization may be generally be initiated by a water-soluble or monomer-soluble initiator or redox initiator combinations customary for emulsion polymerization or suspension polymerization. Examples of water-soluble initiators are the sodium, potassium and ammonium salts of peroxodisulfuric acid, hydroperoxides such as hydrogen peroxide, t-butyl peroxide, t-butyl hydroperoxide, cumene hydroperoxide, isopropylbenzene monohydroperoxide, diisopropylbenzene hydroperoxide, and paramethane hydroperoxide, potassium peroxodiphosphate, tert-butyl peroxypivalate, and azobisisobutyronitrile. Examples of persulphate initiators which may be used include sodium persulphate, potassium persulphate and ammonium persulphate. Examples of monomer-soluble initiators are dicetyl peroxydicarbonate, dicyclohexyl peroxydicarbonate and dibenzoyl peroxide. The initiators may generally be used in an amount of from 0.05% to 3% by weight, for preferably from 0.2 to 2% by weight, based on the total weight of the monomers.

As redox initiators the abovementioned initiators with optional reducing agents are useful. Exemplary reducing agents which may be employed include the sulfites and bisulfites of the alkali metals and of ammonium, for example sodium sulfite, sodium bisulphite, or sodium formaldehyde-bisulphite, the derivatives of sulfoxylic acid such as zinc or alkali metal formaldehyde sulfoxylates, for example sodium hydroxymethanesulfinate, ascorbic acid, polyethyleneamines, sugars, such as dextrose or sucrose, and metal salts. The amount of reducing agent may generally be from 0 to 3% by weight, preferably from 0.1 to 2% by weight, based on the total weight of the monomers.

To control the molecular weight, regulating substances (chain transfer agents) can be used during the polymerization. If regulators are used, they are usually employed in amounts of from 0.01 to 5.0% by weight, based on the monomers to be polymerized, and are metered in separately or after premixing with reaction components. Examples of such substances are n-dodecyl mercaptan, tert-dodecyl mercaptan, mercaptopropionic acid, methyl mercaptopropionate, isopropanol, acetaldehyde, dimeric alpha methylstyrene, cyclohexene, and halogenated hydrocarbons such as chloroform, bromoform, and carbon tetrachloride. It may be added to the reaction medium either before the polymerization or during polymerization.

The polymerization process preferably takes place in the presence of one or more emulsifiers. In some cases, polymerization may be conducted in the absence of emulsifiers. Appropriate amounts of emulsifiers are generally from 0.1 to 5% by weight, based on the amount of monomers. Exemplary emulsifiers which may be employed include anionic, cationic and nonionic emulsifiers. Exemplary anionic surfactants include fatty acid salts, alkyl sulphates, alkylsulphonates, alkylaryl sulphates, alkylarylsulphonates, aryl sulphates, arylsulphonates, sulphosuccinates, alkyl phosphates of alkali metals and abietic acid salts, for example, alkyl sulfates having a chain length of from 8 to 18 carbon atoms, alkyl or alkyl aryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, alkylated diphenyl oxide sulfonate, esters and monoesters of sulfosuccinic acid with monohydric alcohols or alkylphenols. In embodiments of the invention, the redispersible polymer powders may include at least one surfactant, such as a polyoxyalkylenated derivative, such as ethoxylated or ethoxy/propoxylated fatty alcohols ethoxylated or ethoxy/propoxylated triglycerides ethoxylated or ethoxy/propoxylated fatty acids or other known nonionic surfactants. Examples of nonionic surfactants which may be used include alkyl polyglycol ethers or alkyl aryl polyglycol ethers having from 8 to 40 ethylene oxide units.

Protective colloids can be used instead of or in addition to one or more surfactants to stabilize the reaction mixture. Exemplary of the optional protective colloids are polyvinyl alcohols; polyvinyl acetals; polyvinylpyrrolidones; polysaccharides in water-soluble form, e.g. starches (amylase and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, and styrene-maleic acid and vinyl ether-maleic acid copolymers.

All of the monomers may form an initial charge, or all of the monomers may form a feed, or portions of the monomers may form an initial charge and the remainder may form a feed after the polymerization has been initiated. The monomers employed may be introduced as a mixture or separately and simultaneously into the reaction medium, either all at once before the beginning of the polymerization, or during the polymerization in successive fractions or in continuous fashion. In embodiments of the invention, from 0 to 50% by weight, based on the total weight of the monomers, may form an initial charge and the remainder may form a feed. The feeds may be separate (spatially and chronologically), or all or some of the components to be fed may be fed after preemulsification.

After completion of the polymerization, an after-polymerization treatment can be carried out using known methods to remove residual monomer, in general by means of after-polymerization initiated by a redox catalyst. Volatile residual monomers can also be removed by means of distillation, preferably under reduced pressure and if desired while passing inert entrainer gases such as air, nitrogen or steam through or over the polymerization mixture.

The aqueous dispersions or latex, which refers generically to a stable dispersion or emulsion of polymer microparticles in an aqueous medium, obtained in the present invention may generally have a solids content of from 30 to 75% by weight, for example between 35% and 65% by weight, preferably from 40 to 60% by weight.

An above-described chelating agent may be admixed with the aqueous dispersion of the water insoluble film-forming polymer prior to or during polymerization without interfering with the polymerization, or after polymerization, and then the aqueous dispersion may be dried to obtain the water redispersible polymer powder of the present invention. Low levels of chelating agent, generally less than about 0.2% by weight, based upon the total weight of the monomers may be used in the beginning of the polymerization and may be beneficial in reducing residue caused by metal ions present in the water reaction medium. However, the chelating agent when employed in higher amounts prior to or at the start of the polymerization can react with a polymerization initiator, such as a persulphate used to initiate polymerization. The chelating agent could be converted to other, likely smaller, molecules and the persulphate could be consumed and adversely affect the polymerization. Accordingly, when adding large amounts of chelating agent as a colloidal stabilizer in accordance with the present invention, the chelating agent may be added during polymerization, but late in the polymerization so that it does not interfere with the polymerization or inactivate the initiator. For example, a portion of the chelating agent may be added during polymerization after at least about 60% by weight, preferably at least about 80% of the monomers are polymerized. Most preferably, the chelating agent employed as a colloidal stabilizer is admixed with the aqueous dispersion of the water insoluble film-forming polymer after polymerization is complete. Even when the chelating agent is added after polymerization in colloidally stabilizing amounts of at least 0.1% by weight of the monomer, small amounts, such as up to about 0.2% by weight may be added at the start of the polymerization to reduce residue caused by metal ions present in the water reaction medium.

In accordance with the method of the present invention, a water redispersible polymer powder may be produced by drying an aqueous mixture of a water insoluble film-forming polymer and a colloidal stabilizer comprising a chelating agent to obtain a water redispersible polymer powder, wherein the amount of chelating agent is at least 0.1% by weight based upon the weight of the water insoluble film-forming polymer. It has surprisingly been found that the addition of a colloidal stabilizer comprising a chelating agent in an amount of at least 0.1 parts by weight of chelating agent per 100 parts by weight of water insoluble film-forming polymer (at least 0.1% by weight chelating agent, based upon the total weight of the water insoluble film-forming polymer), prior to drying the aqueous polymer dispersion substantially increases the water redispersibility of the polymer powder obtained upon drying the aqueous polymer dispersion. Moreover, it has surprisingly been found that the chelating agents do not adversely increase viscosity of the liquid polymer composition which facilitates spray drying and therefore production of the polymer composition into a redispersible powder. In addition, upon redispersion in water, the redispersible polymers of the present invention exhibit low viscosity which eases their incorporation into application formulations. The chelating agents exhibit stability at a high pH, for example at a pH of 11 or more, and accordingly provide colloidal stability in high pH applications such as cement formulations.

In addition to the chelating agent, optional additives can be added prior to drying the aqueous dispersion, such as other colloidal stabilizers or a spray-drying aid and/or an antifoaming agent. A spray-drying aid may generally be used in a total amount of from 3 to 30% by weight, preferably from 5 to 20% by weight, based on the polymeric constituents of the dispersion. Preferred spray-drying aids which may be employed are partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, styrene-maleic acid and vinyl ether-maleic acid copolymers, preferably a salt of alkylated di-phenyl-ether-di-sulphonic acid, N-alkylsulfosuccinamide, and/or a di- or tetrasodium or potassium salt of an addition product of N-alkyl-sulphosuccinamate with maleic acid. A content of up to 1.5% by weight of antifoam, based on the weight of the polymer particles, may be advantageous during spray-drying.

The viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 75% by weight, preferably from 40% to 60% by weight, based on the total weight of the dispersion.

To prepare the water-redispersible polymer powders, the aqueous dispersions are dried, for example by means of fluidized-bed drying, freeze drying or spray drying. The dispersions are preferably spray dried. Spray drying can be carried out in customary spray drying plants, with atomization being able to be carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C. This inlet temperature preferably is from 110° C. to 180° C., more preferably from 140° C. to 170° C. The outlet temperature may generally be set in the range from 45° C. to 120° C., preferably from 60° C. to 90° C., depending on the plant, the Tg of the resin and the desired degree of drying.

An anticaking agent (antiblocking agent) may be added to the polymer powder to increase storage stability, for example to prevent caking and blocking and/or to improve the flow properties of the powder. This addition may preferably be carried out while the powder is still finely dispersed, for example still suspended in the drying gas. The anticaking agent is preferably of mineral origin. It may preferably be added in an amount of up to 30% by weight, based on the total weight of polymeric constituents. Examples of anticaking agents which may be employed include but are not limited to kaolin, calcium carbonate, magnesium carbonate, talc, gypsum, silica and silicates. The particle sizes of the anticaking agents may preferably be in the range of from 10 nm to 10 μm. A preferred anticaking agent is kaolin. The amount of the anticaking agent may preferably be from 3% to 20%, more preferably from 10% to 15%, based on the total powder quantity. In embodiments of the invention, more than one protective colloid and more than one anticaking agent may be used.

The X50 size of the particle size distribution of the redispersible powder depends on drying conditions and drying equipment. X50 represents the median diameter in micrometers, which means that 50% by weight of the particles are smaller than this diameter. The produced water-redispersible polymer powder preferably has an X50 particle size diameter of from 5 to 100 micrometers, preferably from 20 to 90 micrometers, most preferably from 50 to 80 micrometers. The particle size distribution of the powder can be measured by laser diffraction using a particle size analyzer "Sympatec Helos" at a measuring range of 1.8-350 μm and dispersing the powder by compressed air.

The weight of the polymer particles in the powder, for example, weight of the carboxylated copolymer of vinyl aromatic comonomer and 1,3-diene comonomer described herein in the powder, may generally be at least 50%, preferably at least 60%, more preferably at least 70% of the total weight of the water-redispersible polymer powder, and may generally be up to 95%, preferably up to 85%, more preferably up to 80% of the total weight of the water-redispersible polymer powder.

The redispersible polymer powders, which may have an average particle size of from 5 to 100 micrometers, for example from 10 μm to 20 μm particle size may be readily be dispersed into deionized water to provide an original latex particle size distribution, such as less than 2 μm.

The water-redispersible polymer powders of the present invention have a variety of uses. The powders may be employed as functional additives in a wide variety of compositions such as construction materials, personal care compositions, pharmaceutical compositions, and agricultural compositions, in high salt concentration applications or environments, such as off-shore oil well cementing, oil and gas drilling and cement, and in hard water. Additional uses of the powders are in waste management applications, such as compositions for synthetic covers for bulk material piles, such as waste, coal sludge containment, soil, soil erosion control, which minimize water infiltration, nuisance fugitive dust, odor, and affinity to birds. The powders may be used in alternative landfill covers that are sprayable, use inexpensive widely available and environmentally friendly recycled materials, have good adherence to plastics and glass waste, and can form/harden within a short time, and in adhesion enhancing admixtures. The powders may also be employed in the production of foams, such as polyurethane foams.

In preferred embodiments, the water-redispersible polymer powder may be used as an additive in a setting composition which may further include an inorganic hydraulic binder. Examples of inorganic binders include or cements, such as Portland cement, alumina cement, pozzolanic cement, slag cement, magnesia cement and phosphate cement; gypsum hemihydrate and water-glass. Illustrative uses of the polymer composition according to the present invention are in tile adhesives, construction adhesives, renders, joint mortars, plasters, troweling compositions, filling compositions, such as floor filling compositions (e.g. self-leveling flooring compounds), concrete repair joints, joint mortars, tape joint compounds, concrete, water proofing membrane applications, and crack isolation membrane applications. In particular, the use of the water-redispersible polymer powder described herein in a setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition.

A preferred use of the water-redispersible polymer powder is in concrete compositions or other compositions which exhibit a high pH, for example a pH of at least 11, for example from 11.5 to 13.5. The redispersible polymer powders of the present invention may be employed in tile adhesives, such as cement-based tile adhesives. Cement-based tile adhesives may generally comprise 5 to 50 parts by weight of cement, preferably Portland cement, as the hydraulic binder; 40 to 70 parts by weight of quartz sand, preferably having a particle size of from 0.1 mm to 0.5 mm, as the main filler, and 0.1% to 10% by weight, preferably 1% to 6% by weight (based on the dry weight of the tile adhesive) of the redispersible polymer powder according to the present invention. Further optional components include one or more cellulose ethers (preferably in a total amount of 0.05% to 1% by weight, more preferably 0.2% to 0.5% by weight, based on the dry weight of the tile adhesive) to control rheology, water retention, slip resistance and improved workability; quartz or lime stone powder having a particle size of from 30 μm to 60 μm as fine co-filler to improve consistency and workability; and cellulose or mineral fibers to improve the slip resistance.

In other embodiments, the water-redispersible polymer powder may be used in external thermal insulation systems ETICS, particularly as an adhesive on the thermally insulating board layer to reduce the water absorption and improve the impact resistance of the external thermal insulation system. ETICS is a multi component system that comprises an insulation panel which is fixed to the outside of buildings. Water redispersible polymer powders are binders in dry-mix mortar formulations which make sure that the mineral based mortar binds to the surface of the insulation panel, which generally is made from an expanded polystyrene (EPS).

Another use of the water-redispersible polymer powders is in self-leveling flooring compounds SLFC. The powders may be added to improve the adhesion to the substrate, the flexibility, the abrasion resistance and the aging properties.

Furthermore, the water-redispersible polymer powder according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the water-redispersible polymer powder may be used as the sole binder in coating compositions and adhesives.

Depending on their end-use, it may be advantageous to use the water-redispersible polymer powder in combination with one or more known water-redispersible polymer powders, such as a homopolymer or copolymer of one or more "principle" monomers from the group consisting of vinyl esters of unbranched or branched alkylcarboxylic acids having from 1 to 15 carbon atoms, methacrylic esters and acrylic esters of alcohols having from 1 to 15 carbon atoms, olefins, and vinyl halides.

The following examples are provided for illustrative purposes only and are not intended to limit the scope of the claims that follow. Unless otherwise indicated, all parts and percentages are by weight, all temperatures are in ° C., and all pressures are in bars or atmospheric unless otherwise indicated to the contrary:

Example 1

A redispersible polymer powder may be produced using a water insoluble film forming carboxylated styrene butadiene (SB) latex which has a comonomer content of 62 parts styrene, 35 parts butadiene, and 3 parts itaconic acid (a carboxylation of 3% by weight of itaconic acid, based upon the total comonomer weight), and a commercially available aqueous solution of a chelating agent. The SB latex may have an average particle size of 150 nm. The commercially available solution of the chelating agent may be VERSENOL 120 which is a 41% by weight solution of a chelating agent which is the trisodium salt of hydroxyethylethylene-diamine triacetate, which is available from the Dow Chemical Company, Midland, Mich., 48640. The VERSENOL 120 has a chelation value of 120 (mg as $CaCO_3$ per grain) and a pH of 11.0 to 11.8 (1 wt % aqueous solution). A mixture of the styrene butadiene (SB) latex and VERSENOL 120 is prepared as follows: 64 parts of a 50% by weight latex dispersion (32 parts neat latex), 32 parts of 10% VERSENOL 120 solution (3.2 parts of neat VERSENOL 120), and 3 parts of water are mixed to make a mixture with a total solid content of 35% by weight. This mixture was pumped to a two-fluid nozzle atomizer equipped on a Mobile Minor spray dryer. The air pressure to the nozzle was fixed at 1 bar with 50% flow which is equivalent to 6 kg/hr of airflow. The spray drying was conducted in an $N_2$ environment with an inlet temperature fixed at 140° C., and the outlet temperature was targeted to 50° C.±1° C. by tuning the feed rate of the mixture. Concurrently, kaolin powder (Kamin 90) was added into the chamber for spray drying as an anti-caking agent, with the amount being controlled to be 10% by weight of the dry powders.

Figure 1:
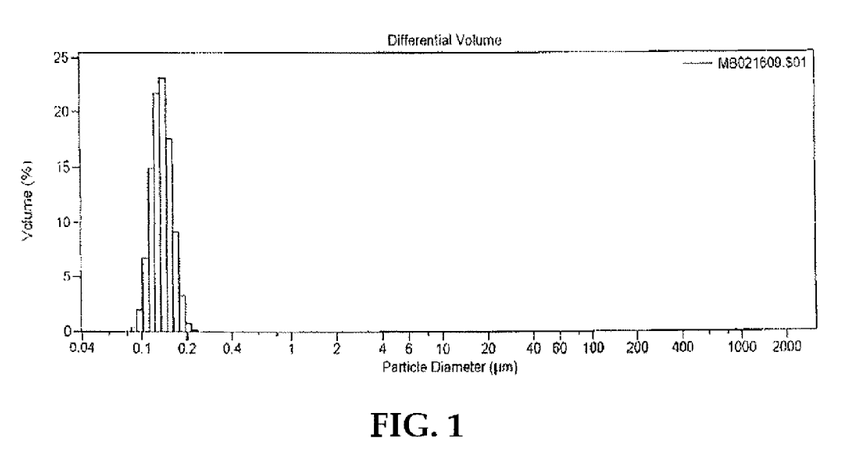
FIG. 1 is a graph showing particle size distribution data for a redispersible polymer powder of the present invention upon redispersing in water where the colloidal stabilizer in the redispersible polymer powder is the chelating agent trisodium N-(hydroxyethyl)-ethylenediaminetriacetate.

The redispersible polymer powder obtained by the spray drying had an average particle size between 10 to 20 μm. The spray dried powder was dispersed into deionized (DI) water at a 1% by weight solids level, and vortexed for 30 seconds twice. The redispersion was then measured using a Coulter LS 230 Laser Diffraction Particle Size Analyzer. FIG. 1 shows the particle size distribution data of the redispersion, which indicates that the redispersible polymer powder of the present invention was readily dispersed to the original SB latex particle size distribution.

Example 2

A redispersible polymer powder may be produced as in Example 1 except the commercially available solution of the chelating agent may be VERSENE 100 which is a 39% by weight solution of a chelating agent which is tetrasodium ethylenediaminetetraacetate, which is available from the Dow Chemical Company, Midland, Mich. 48640. The VERSENE 100 has a chelation value of 102 (mg as $CaCO_3$ per gram) and a pH of 11 to 12 (1 wt % aqueous solution).

Figure 2:
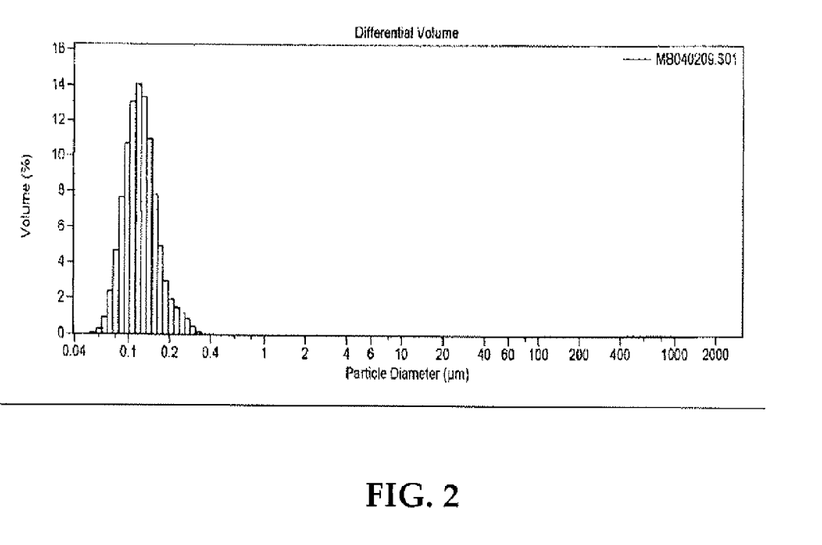
FIG. 2 is a graph showing particle size distribution data for a redispersible polymer powder of the present invention upon redispersing in water where the colloidal stabilizer in the redispersible polymer powder is the chelating agent tetrasodium ethylenediaminetetraacetate.

The redispersible polymer powder obtained by the spray drying had an average particle size between 10 to 20 µm. The spray dried powder was dispersed into deionized (DI) water at a 1% by weight solids level, and vortexed for 30 seconds twice. The redispersion was then measured using a Coulter LS 230 Laser Diffraction Particle Size Analyzer. FIG. 2 shows the particle size distribution data of the redispersion, which indicates that the redispersible polymer powder of the present invention was readily dispersed to the original SB latex particle size distribution.

Comparative Example A

A redispersible polymer powder may be produced as in Example 1 except the commercially available solution of the chelating agent is replaced with 3.2% by weight of MOWIOL 4-88 which is a partially hydrolyzed PVOH (polyvinylalcohol) in granular form, and is available from Kuraray Europe GmbH, Division PVA/PVB D-65926 Frankfurt am Main, Germany. The MOWIOL 4-88 has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mgKOH/g a residual acetyl content of 10.8±0.8 w/w %, and a maximum ash content of 0.5% (calculated as $Na_2O$).

Figure 3:
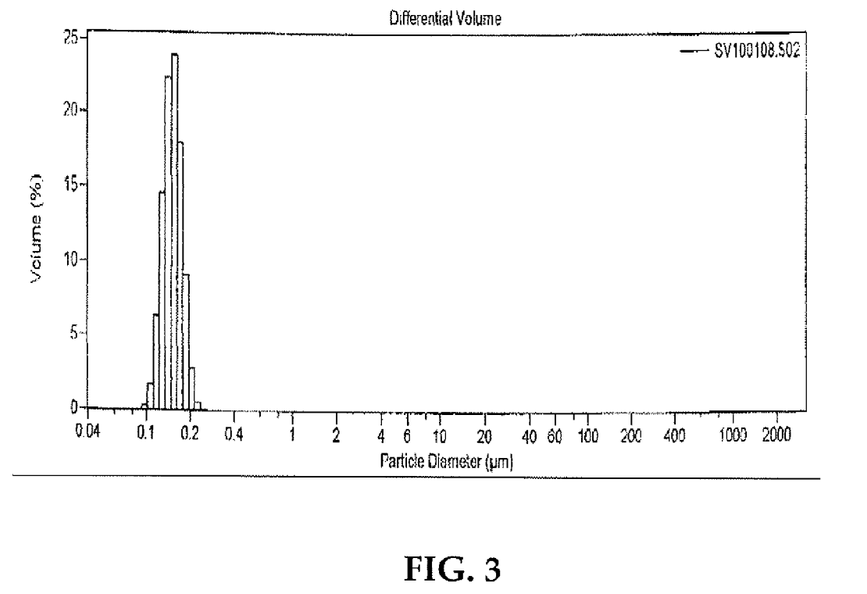
FIG. 3 is a graph showing particle size distribution data for a comparative redispersible polymer powder upon redispersing in water where the colloidal stabilizer in the redispersible polymer powder is a polyvinyl alcohol (PVOH).

The redispersible polymer powder obtained by the spray drying had an average particle size between 10 to 20 µm. The spray dried powder was dispersed into deionized (DI) water at a 1% by weight solids level, and vortexed for 30 seconds twice. The redispersion was then measured using a Coulter LS 230 Laser Diffraction Particle Size Analyzer. FIG. 3 shows the particle size distribution data of the redispersion, which indicates that the redispersible polymer powder was readily dispersed to the original SB latex particle size distribution.

Viscosity Comparison

The Brookfield Viscosity of a mixture of 150 g of the styrene butadiene (SB) latex (which has a comonomer content of 62 parts styrene, 35 parts butadiene, and 3 parts itaconic acid) with a solids content of 50% by weight, and 50 g of the PVOH colloidal stabilizer MOWIOL 4-88, with a solids content of 15% by weight, was measured using a Brookfield Viscometer Model LVTDV-II under the conditions of 60 rpm, LV Spindle 4, and 25° C. The viscosity reading was 3252 cps.

The Brookfield Viscosity of a mixture of 150 g of the styrene butadiene (SB) latex (which has a comonomer content of 62 parts styrene, 35 parts butadiene, and 3 parts itaconic acid) with a solids content of 50% by weight, and 50 g of the chelating agent colloidal stabilizer VERSENOL 120 used in Example 1, with a solids content of 15% by weight, was measured using a Brookfield Viscometer Model LVTDV-II under the conditions of 60 rpm, LV Spindle 4, and 25° C. The viscosity reading was less than 100 cps.

The Brookfield Viscosity of a mixture of 150 g of the styrene butadiene (SB) latex which has a comonomer content of 62 parts styrene, 35 parts butadiene, and 3 parts itaconic acid) with a solids content of 50% by weight, and 50 g of the chelating agent colloidal stabilizer VERSENE 100 used in Example 2, with a solids content of 15% by weight, was measured using a Brookfield Viscometer Model LVTDV-II under the conditions of 60 rpm, LV Spindle 4, and 25° C. The viscosity reading was less than 100 cps.

The viscosity of the latex compositions containing a chelating agent as a colloidal stabilizer as in Examples 1 and 2 was so low it could not be measured whereas the viscosity of the latex composition containing PVOH as a colloidal stabilizer was substantial, being 3252 cps, which indicates more difficulty in spray drying.

The particle size distributions upon redispersion shown in FIGS. 1, 2, and 3 show that the redispersibility of the redispersible polymer powders of the present invention which contain a chelating agent as a colloidal stabilizer (Examples 1 and 2 and FIGS. 1 and 2) is as good as the redispersibility of the comparative redispersible polymer powder which contains PVOH as a colloidal stabilizer (Comparative Example A and FIG. 3). However, the viscosity of compositions which contain the chelating agent is unexpectedly lower than the viscosity of the composition which contains PVOH as a colloidal stabilizer thereby enabling the use of higher solids content compositions for spray drying and lower pressure equipment for more efficient production of redispersible polymer powders.

Example 3

The components and their relative amounts (% by weight or parts by weight, pbw) which may be used to prepare cement-based mortar compositions using the redispersible powder compositions of Examples 1, 2, and Comparative Example A, and a Comparative cement-based mortar composition (Comparative Formula B) which does not employ any redispersible powder composition are shown in Table 3. The different cement-based mortar compositions may be prepared by dry blending the solid components indicated in Table 3 and then adding water. Various properties of the cement-based mortar compositions and their performance may be tested and the results are also shown in Table 3.

The following test methods were used in the indicated Examples:

Dry Mix Preparation:

The cement, sand, polymer, and thickener are weighed and placed into a plastic bag which is then hand mixed for 2 minutes and conditioned for 24 hrs.

Viscosity:

Viscosities are measured with a Brookfield Synchro-lectric viscometer (Model RVT) in combination with a Brookfield Helipath stand at 25° C. The mortar is filled into a density cup and the spindle (T-F) is positioned such that it just touches the surface of the mortar. The spindle of the viscometer rotates for 2 minutes with 5 rpm. During the rotation the viscometer is moved up and down so that its rotating spindle describes a helical path through the sample. The first measurement is not taken until the spindle is fully submerged after one full rotation. Four readings are measured as the viscometer moves in each direction, the average of which is reported.

Density:

Mortars are placed into a container of known volume, tamped down, and then weighed.

Shear Strength:

Plywood shear strength was measured according to ANSI 118.11, sections 4.1.1 and 4.1.2. Samples are assembled with a mortar layer bonding one piece of plywood and one piece of quarry tile together. Shear strength is measured after samples are aged for 7 days and 28 days. Impervious ceramic mosaic shear strength was measured according to ANSI 118.4, sections 5.2.2, 5.2.3, and 5.2.4. Samples are assembled with a mortar layer bonding two pieces of impervious ceramic mosaic tile together. Shear strength is also measured after samples are aged for 7 days, 7 days followed by immersion in water for 7 days, and 28 days.

The formulations for the cement-based mortar formulations and test results are presented in Table 3:

TABLE 3

Cement-based Mortar Formulations and Test Results

| | Formula (% by Weight) | | | |
|---|---|---|---|---|
| RAW MATERIAL | Ex. 1 | Ex. 2 | Comp. A | Comp. B |
| Portland Cement Type 1 | 35 | 35 | 35 | 35 |
| Sand F-80, Silica Sand | 62.66 | 62.66 | 62.66 | 64.66 |
| Redispersible Polymer Powder of Comparative Example A (SB latex and PVOH) | — | — | 2 | None |
| Redispersible Polymer Powder of Example 1 (SB latex and VERSENOL 120) | 2 | — | — | None |
| Redispersible Polymer Powder of Example 2 (SB latex and VERSENE 100) | — | 2 | — | None |
| WALOCEL MW 40000 PFV, hydroxyethyl methyl cellulose (HEMC) thickener (Dow Chemical Co.) | 0.34 | 0.34 | 0.34 | 0.34 |
| Total, % by weight | 100 | 100 | 100 | 100 |
| Water:Powder Ratio by weight | 0.230 | 0.235 | 0.220 | 0.225 |
| Brookfield viscosity 5 RPM (cps) | 471250 | 462500 | 455000 | 422500 |
| Density (g/ml) | 1.58 | 1.65 | 1.55 | 1.57 |
| Shear Strength, Plywood 7 day (psi) | 104 ± 10 | 85 ± 11 | 110 ± 8 | 47 ± 15 |
| Shear Strength, Plywood 28 day (psi) | 129 ± 29 | 117 ± 21 | 137 ± 18 | 55 ± 12 |
| Shear Strength, Impervious ceramic mosaic tile, 7 day (psi) | 207 ± 16 | 252 ± 30 | 251 ± 19 | 213 ± 26 |
| Shear Strength, Impervious ceramic mosaic tile, 28 day (psi) | 208 ± 9 | 246 ± 24 | 269 ± 15 | 209 ± 16 |
| Shear Strength, Impervious ceramic mosaic tile, 7 day water immersion (psi) | 201 ± 17 | 206 ± 26 | 193 ± 16 | 219 ± 23 |

As shown in Table 3, mortar formulations 1, 2, and Comparative A which contain a redispersible polymer powder exhibit superior performance in terms of shear strength bonding to plywood in the 7 day and 28 day tests compared to the shear strength obtained with mortar formulation Comparative B which does not contain a redispersible polymer powder. Also, as shown in Table 3, mortar formulations 1 and 2 which contain a chelating agent as a colloidal stabilizer exhibit comparable performance compared to mortar formulation Comparative A which contains PVOH as a colloidal stabilizer. However, as shown in Examples 1, 2, and Comparative Example A, the viscosity of compositions which contain the chelating agent is unexpectedly lower than the viscosity of the composition which contains PVOH as a colloidal stabilizer thereby enabling the use of higher solids content compositions for spray drying and lower pressure equipment for more efficient production of redispersible polymer powders, without loss of redispersibility and without adversely affecting performance in mortar formulations.

What is claimed is:

1. A water redispersible polymer powder comprising a co-dried admixture of a water insoluble film-forming polymer and a colloidal stabilizer comprising a chelating agent, wherein the amount of chelating agent is at least 0.1% by weight based upon the weight of the water insoluble film-forming polymer wherein the redispersable powder can be readily redispersed into deionized water to provide a dispersion having submicron particle size.

2. A water redispersible polymer powder as claimed in claim 1 wherein the amount of chelating agent is from 1% by weight to 20% by weight, based upon the weight of the water insoluble film-forming polymer.

3. A water redispersible polymer powder as claimed in claim 1 wherein the chelating agent comprises at least one member chosen from alkylenepolyaminepolyacetates, porphyrins, ethylenediamine and its derivatives, 2,3-dimercapto-1-propanol, succinic acid, nitrilotriacetic acid (NTA), 2,3-dimercaptosuccinic acid (DMSA), sodium diethanolglycine, and salts thereof.

4. A water redispersible polymer powder as claimed in claim 1 wherein the chelating agent is an alkylenepolyaminepolyacetate or alkali metal salt thereof.

5. A water redispersible polymer powder as claimed in claim 1 wherein the chelating agent comprises at least one member chosen from ethylenediaminetetraacetic acid (EDTA), diethylenetriaminepentacetic acid (DTPA), N-(hydroxyethyl)ethylene-diaminetetraacetic acid (HEDTA), nitrilotriacetic acid (NTA), 2,3-dimercaptosuccinic acid (DMSA), and salts thereof.

6. A water redispersible polymer powder as claimed in claim 1 wherein the water insoluble film-forming polymer comprises at least one polymer prepared from a styrene butadiene copolymer, a styrene butadiene copolymerized with another comonomer, a styrene acrylate copolymer, an acrylate, a vinylacetate ethylene (VAE) copolymer, a VAE/VeoVA copolymer mixture, a polyurethane, an epoxy, a polyolefin, a cellulose, or a cellulose derivative.

7. A water redispersible polymer powder as claimed in claim 1 wherein the water insoluble film-forming polymer comprises at least one member chosen from vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers, and copolymers of acrylic esters.

8. A water redispersible polymer powder as claimed in claim 1 which is without a protective layer or skin of surface-hardening metal ions.

9. A method for producing a water redispersible polymer powder comprising drying an aqueous mixture of a water insoluble film-forming polymer and a colloidal stabilizer comprising a chelating agent to obtain a water redispersible polymer powder, wherein the amount of chelating agent is at least 0.1% by weight based upon the weight of the water insoluble film-forming polymer.

10. A composition comprising a water redispersible polymer powder as claimed in claim 1 as an additive.

11. A composition as claimed in claim 1, further comprising cement or concrete.

* * * * *